US012760847B2

(12) United States Patent
Chan et al.

(10) Patent No.: US 12,760,847 B2
(45) Date of Patent: Oct. 13, 2026

(54) METHOD AND SYSTEM FOR OPTIMIZING PIPELINE OPERATION

(71) Applicant: VENTURI ENGINEERING SOLUTIONS INC., Edmonton (CA)

(72) Inventors: Anthony Chan, Edmonton (CA); Jordon French, Edmonton (CA)

(73) Assignee: Venturi Engineering Solutions Inc., Edmonton (CA)

( * ) Notice: Subject to any disclaimer, the term of this patent is extended or adjusted under 35 U.S.C. 154(b) by 401 days.

(21) Appl. No.: 18/187,794

(22) Filed: Mar. 22, 2023

(65) Prior Publication Data

US 2023/0304637 A1 Sep. 28, 2023

Related U.S. Application Data

(60) Provisional application No. 63/323,282, filed on Mar. 24, 2022.

(51) Int. Cl.

| | |
|---|---|
| ***F17D 3/01*** | (2006.01) |
| ***F17D 1/17*** | (2006.01) |
| ***G05B 13/04*** | (2006.01) |

(52) U.S. Cl.

CPC ................. *F17D 3/01* (2013.01); *F17D 1/17* (2013.01); *G05B 13/048* (2013.01)

(58) Field of Classification Search

CPC ........... G06F 30/18; G06F 30/13; G06F 30/20

USPC ........................................................ 700/282

See application file for complete search history.

(56) References Cited

U.S. PATENT DOCUMENTS

| | | | | |
|---|---|---|---|---|
| 7,643,974 | B2 * | 1/2010 | Harper | F17D 3/00 703/7 |
| 2005/0149305 | A1 * | 7/2005 | Araki | G06F 30/20 703/9 |
| 2019/0187678 | A1 * | 6/2019 | Muinda | G01M 5/0033 |
| 2024/0193547 | A1 * | 6/2024 | Chung | G06Q 10/063114 |

FOREIGN PATENT DOCUMENTS

| | | | | | |
|---|---|---|---|---|---|
| CA | 2477968 | C | * | 8/2011 | G05B 23/0283 |
| CN | 116595695 | A | * | 8/2023 | G06F 30/18 |
| EP | 2267621 | B1 | * | 10/2011 | G01N 17/00 |
| EP | 4224141 | A1 | * | 8/2023 | G06Q 50/06 |
| JP | 2021519433 | A | * | 8/2021 | G06N 5/01 |
| WO | WO-2018179727 | A1 | * | 10/2018 | F17D 5/02 |

OTHER PUBLICATIONS

Seborg et al, Process Dynamics and Control, Book, Sep. 2016 4th ed. Wiley ISBN: 978-1-119-28591-5.

* cited by examiner

*Primary Examiner* — Ronald D Hartman, Jr.

(74) *Attorney, Agent, or Firm* — Bennett Jones LLP

(57) ABSTRACT

Methods and systems for optimizing pipeline operation are disclosed, including an operating system for optimizing a pipeline objective for a pipeline system comprising a plurality of pipeline sections, the operating system comprising a controller configured to: (i) generate a current state of at least one section of the pipeline, the current state comprising the measured state of at least one pipeline object and at least one fluid object; (ii) generate a line fill; (iii) generate a predicted future state of the at least one section of the pipeline from the line fill, and a schedule of planned additions of fluids and planned flow rates; (iv) generate an optimized future state of the at least one section of the pipeline with an optimization function; and (v) determine one or more setpoints to implement the optimized future state.

19 Claims, 5 Drawing Sheets

METHOD AND SYSTEM FOR OPTIMIZING PIPELINE OPERATION

CROSS-REFERENCE TO RELATED APPLICATIONS

The present application claims the priority benefit of U.S. Provisional Application 63/323,282, filed on Mar. 24, 2022, the entire contents of which are incorporated herein by reference.

FIELD OF THE INVENTION

The invention relates to a system and method of selecting and implementing desired or optimized operational configurations of a pipeline.

BRIEF SUMMARY AND ASPECTS OF THE INVENTION

The invention relates to a system and method of selecting and implementing operational configurations of liquid pipelines that improve or optimize a given objective such that operational and/or regulatory limits are not exceeded. Given objectives may include cost, emissions, energy or resource usage, or other pertinent quantifiable objectives.

In view of the described devices, systems, and methods and variations thereof, certain more particularly described aspects of the invention are presented below. These particularly recited aspects should not however be interpreted to have any limiting effect on any different claims containing different or more general teachings described herein, or that the "particular" aspects are somehow limited in some way other than the inherent meanings of the language literally used therein.

Aspect 1A. An operating system for a pipeline system comprising a plurality of pipeline sections and a pipeline operator operatively connected to pipeline actuators, the operating system comprising a controller configured to:

(a) create or update at least one pipeline object and at least one fluid object, and generate a current state of at least one section of the pipeline, the current state comprising the measured state of the at least one pipeline object and at least one fluid object, which may comprise measured pipeline data comprising one or more of temperature, density, viscosity, pressure, flow rate, and/or drag reducing agent injection rate;

(b) generate a line fill comprising a sequential order and volume of fluids present in the pipeline;

(c) generate a predicted future state of the at least one section of the pipeline from the line fill and a schedule of planned additions of fluids and planned flow rates;

(d) generate an optimized future state of the at least one section of the pipeline with an optimization function; and (e) provide setpoints for the pipeline operator to implement the optimized future state, the setpoints comprising an optimized setting for one or more pipeline actuators such as pressure setpoints, pump statuses, variable frequency drive (VFD) speeds and states, and drag reducing agent (DRA) injection rates.

Aspect 1B. An operating system for optimizing a pipeline objective for a pipeline system comprising a plurality of pipeline sections, the operating system comprising a controller configured to:

(a) generate a current state of at least one section of the pipeline, the current state comprising the measured state of at least one pipeline object and at least one fluid object;

(b) generate a line fill comprising a sequential order and volume of fluids present in the pipeline;

(c) generate a predicted future state of the at least one section of the pipeline from the line fill, and a schedule of planned additions of fluids and planned flow rates;

(d) generate an optimized future state of the at least one section of the pipeline with an optimization function; and (e) determine one or more setpoints to implement the optimized future state.

Aspect 1C. A method of optimizing a pipeline objective for a pipeline system comprising a plurality of pipeline sections, comprising:

(a) generating a current state of at least one section of the pipeline, the current state comprising the measured state of at least one pipeline object and at least one fluid object;

(b) generating a line fill comprising a sequential order and volume of fluids present in the pipeline;

(c) generating a predicted future state of the at least one section of the pipeline from the line fill, and a schedule of planned fluids and planned flow rates;

(d) generate an optimized future state of the at least one section of the pipeline with an optimization function; and (e) determining setpoints for the pipeline to implement the optimized future state.

Aspect 1D. A method of optimizing a pipeline objective for a pipeline system comprising a plurality of pipeline sections and at a plurality of pump stations each having at least one pump, comprising the steps of:

(a) generating a current state of at least one section of the pipeline, the current state comprising measured pipeline data comprising one or more of temperature, density, viscosity, pressure, flow rate, and/or drag reducing agent injection rate;

(b) generating a line fill comprising a sequential order and volume of fluids present in the pipeline;

(c) generating a future state of the at least one section of the pipeline from the line fill and a schedule of planned fluids and planned flow rates;

(d) optimizing the pipeline objective using at least one of a cost function, an emissions function, and/or an energy/resource usage function; and (e) providing setpoints for the pipeline based on the results of the optimization, the setpoints comprising one or more of pressure setpoint, pump selection, pump speed, drag reduction agent injection rate.

Aspect 2. The system of any one of Aspects 1A and 1B, and the method of any one of Aspects 1C and 1D, as well as any one of Aspects 3 to 10, wherein the optimization function comprises at least one of a cost minimization function, an emissions minimization function, and/or an energy/resource usage minimization function.

Aspect 3. The system of any one of Aspects 1A and 1B, and the method of any one of Aspects 1C and 1D, as well as any one of Aspects 2, and 4 to 10 wherein the pipeline objective is cost minimization and the cost minimization function comprises cost of (a) energy, (b) risk, (c) safety, reliability and/or efficiency measures, (d) customer satisfaction and/or (e) carbon emission intensity.

Aspect 4. The system any one of Aspects 1A and 1B, and the method of any one of Aspects 1C and 1D, as well as any one of Aspects 2 to 3, and 5 to 10, wherein cost of energy is the same or different for different pipeline sections, and cost minimization is optimized for each pipeline section.

Aspect 5. The system any one of Aspects 1A and 1B, and the method of any one of Aspects 1C and 1D, as well as any one of Aspects 2 to 4, and 6 to 10, wherein the measured state comprises measured pipeline data.

Aspect 6. The system any one of Aspects 1A and 1B, and the method of any one of Aspects 1C and 1D, as well as any one of Aspects 2 to 5, and 7 to 10, wherein the measured pipeline data comprises one or more of temperature, density, viscosity, pressure, flow rate, and/or drag reducing agent injection rate.

Aspect 7. The system any one of Aspects 1A and 1B, and the method of any one of Aspects 1C and 1D, as well as any one of Aspects 2 to 6, and 8 to 10, wherein the setpoints comprise an optimized setting for one or more pipeline actuators.

Aspect 8. The system any one of Aspects 1A and 1B, and the method of any one of Aspects 1C and 1D, as well as any one of Aspects 2 to 7, and 9 to 10, wherein the optimized setting for the one or more pipeline actuators includes one or more of pressure setpoints, pump statuses, variable frequency drive (VFD) speeds and states, and drag reducing agent (DRA) injection rates.

Aspect 9. The system any one of Aspects 1A and 1B, and the method of any one of Aspects 1C and 1D, as well as any one of Aspects 2 to 8, and 10, further comprising an automated pipeline operator configured to: receive the setpoints from the controller; and implement the setpoints by controlling pipeline actuators.

Aspect 10. The system any one of Aspects 1A and 1B, and the method of any one of Aspects 1C and 1D, as well as any one of Aspects 2 to 9, further comprising a control system configured to: receive the setpoints as inputs; and implement the setpoints by controlling pipeline actuators.

Aspect 11. An operating system for optimizing a pipeline objective for a pipeline system comprising a plurality of pipeline sections, comprising or consisting essentially of any combination of elements or features disclosed herein.

Aspect 12. A method for optimizing a pipeline objective for a pipeline system comprising a plurality of pipeline sections, comprising or consisting essentially of any combination of elements or features disclosed herein.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

In the drawings shown in the specification, like elements may be assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention.

DETAILED DESCRIPTION

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1A:
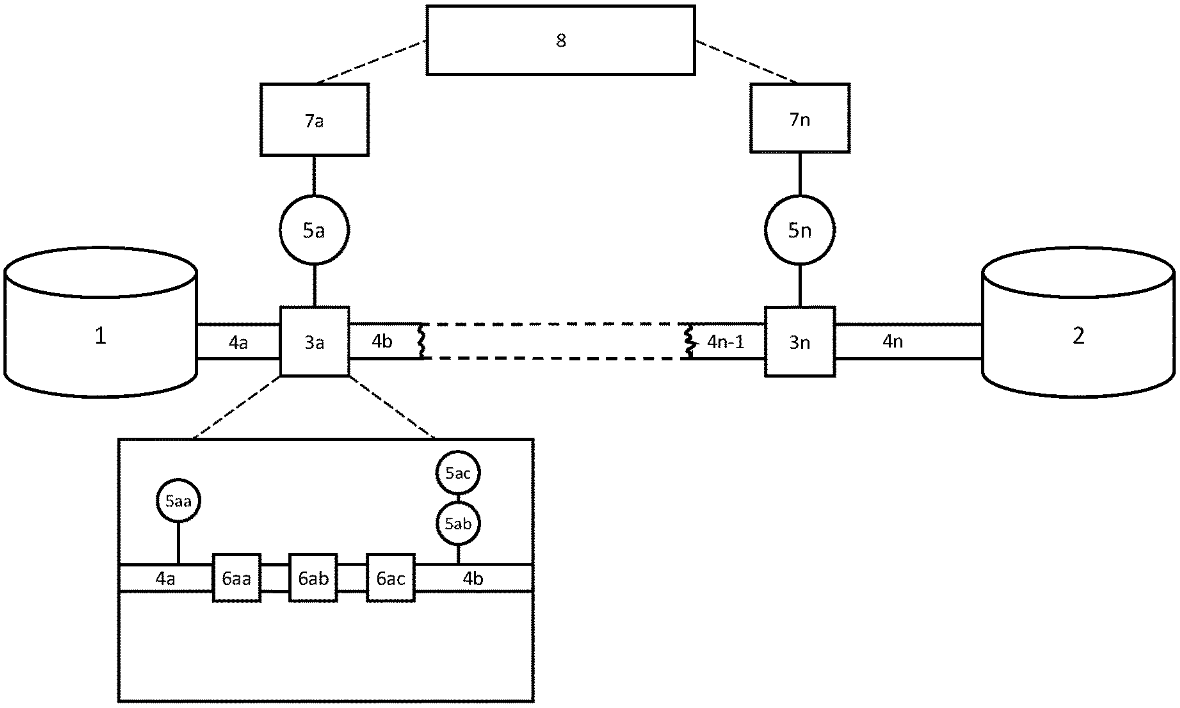
FIG. 1A is a schematic illustration of a pipeline system.

A pipeline for transporting fluids is shown schematically in FIG. 1. Conventionally, fluids are injected at an injection station (1) into the pipeline sections (4*a*-4*n*), for delivery to the delivery station (2) for the purpose of storage or operator-to-operator transfer. Delivery stations may not have pumps that add energy to the fluid in the scope of the pipeline. The injection station (1) may also include various instrumentation (5) and pumps (6), as is well known in the art. Embodiments of the invention may relate to pipelines transporting liquids or gases, or both.

The pipeline sections (4*a*, 4*n*) may be segmented by pump stations (3*a*, 3*n*) which include additional instrumentation (5*aa*, ab, ac) and one or more pumps (6*aa*, ab, ac). The instrumentation (5*aa*, ab, ac) at the injection station is typically more accurate than at the other stations and is typically more robust and contains a complete range of measurement devices than at the other stations. Instrumentation may include any measurement device which measures and reports any relevant pipeline parameter, directly or indirectly, including without limitation pressure transmitters, temperature transmitters, flow meters, densitometers, and viscometers.

Pumps (6) may include any mechanical equipment for adding energy to the fluid being transported in the pipeline, and may be arrayed in series or in parallel. If the fluid is gaseous, the pumps (6) may be referred to as compressors, as is well known in the art. Typically, a pump or compressor may be driven by electric motors controlled by a variable frequency drive (VFD), as is well known in the art. Compressors for gas pipelines may also be driven by combustion of the gas from the pipeline in piston engines or gas turbines.

Figure 1B:
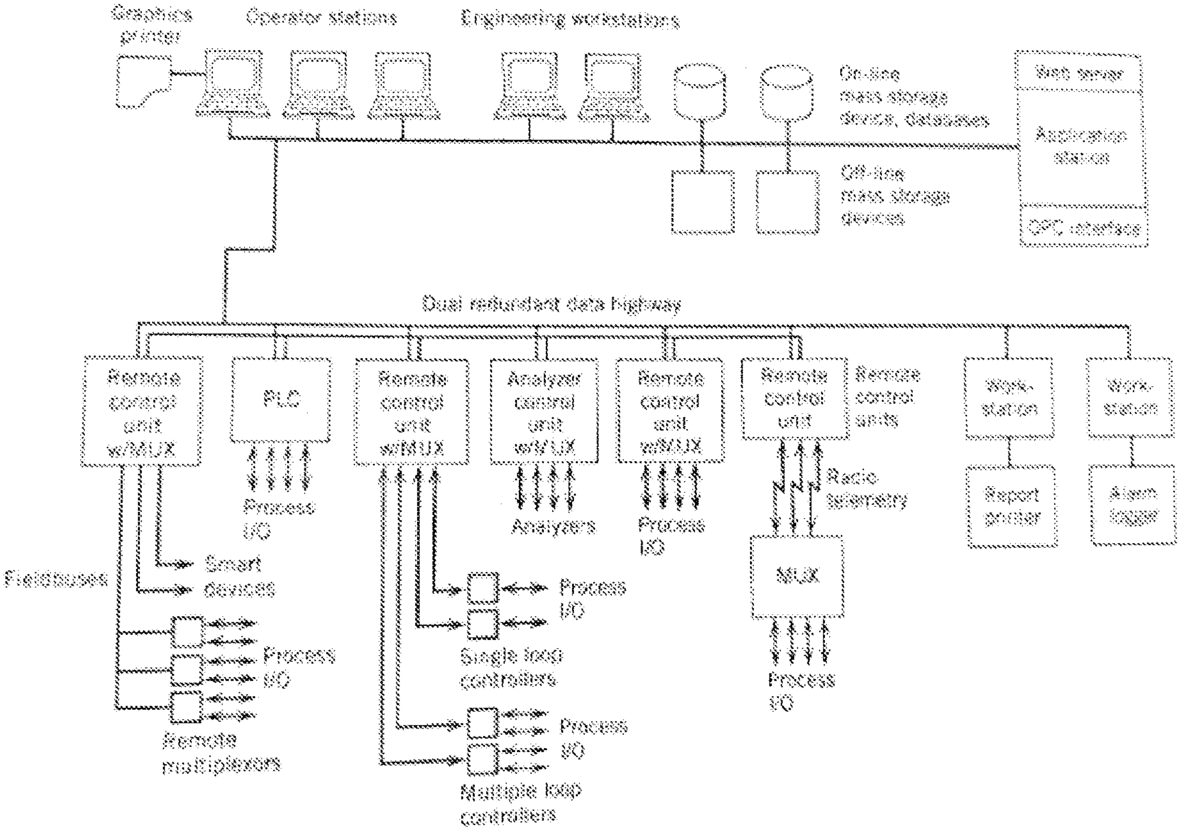
FIG. 1B is a schematic illustration of a SCADA system.

A pipeline SCADA (Supervisory Control and Data Acquisition) system (8) includes a remote terminal unit interface (7*a*, 7*n*), and measurement devices (5), and is operatively connected to the pipeline system pump stations (3). The SCADA system is a high-level computer system that collects and displays pipeline data, displays, and raises alarms and warnings, and implements pipeline control actions by operators, and may include error handling and pre-processing modules. SCADA systems and networks are well known in the art—see for example "Process Dynamics and Control", Seborg and Edgar—and need not be further described herein. A representative schematic of a SCADA system is shown in FIG. 1B.

Figure 2:
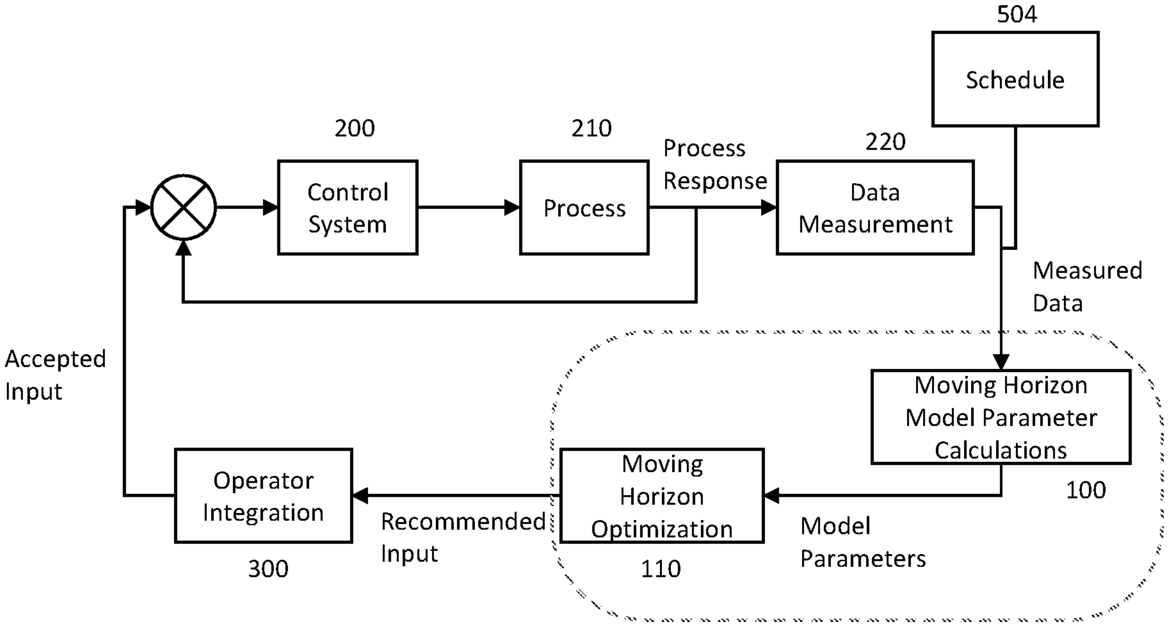
FIG. 2 is a schematic process control block diagram of one embodiment.

In one embodiment, a method of the present invention comprises a control loop as shown schematically in FIG. 2. The process operator (300) implements recommendations provided by the optimization module (100, 110). The operator (300) may consider and integrate factors not captured in the process data or schedule that influence the desired process control setpoints, pump selection, drag reducing agent (DRA) injection rate or VFD status. The operator (300) may be human, or partly or wholly automated (e.g., an automated operator computer system and/or software). In some embodiments, the operator (300) may include machine learning algorithms.

The control systems (200) control pipeline actuators in the process that include but are not limited to regulatory systems, pressure control systems, pump speed controls, emergency relief systems, actuators, emergency shutdown (ESD) controls, and the like. As a result, the physical process (210) is controlled and optimized by the control system (200) outputs. The status and/or changes to the physical system are measured by data measurement system (220), which may include any instrumentation (5), the SCADA system (8) and any data storage and network connections to workstations and servers.

In examples where the operator (300) is automated (e.g., an automated operator system), the operator (300) and control system (200) may be one of the same, or otherwise integrated.

A forward-looking schedule (504) is required for future state predictions, and includes scheduled flow rate setpoints and fluid batch changes. Preferably, the length of the schedule should be at least as long as the time required for fluid to completely fill the largest station-to-station section of a pipeline. The schedule includes details such as planned flow rates and the fluid injection schedule. The amount of time described by the schedule should be greater than the amount of time to fill the largest section of pipeline between two stations, such as the time to fill the entire pipeline.

Measured data (220) and the schedule (504) then provide the inputs required for calculating moving horizon model parameters in a prediction module (100) to predict a future state of the pipeline system. The optimized parameters that are recommended by module (110), including pressure setpoints, pump configuration, DRA injections and VFD speed settings, do not influence the amount of base frictional losses that must be overcome to move the fluid. These base frictional losses are determined by the batch sequence and the flow rate. Since the batch sequence and flow rate are not considered in the optimization it is possible to separate the parameter estimation in module (100) from the optimization in module (110).

Prediction Module—Moving Horizon Model Parameter Calculations

Figure 3:
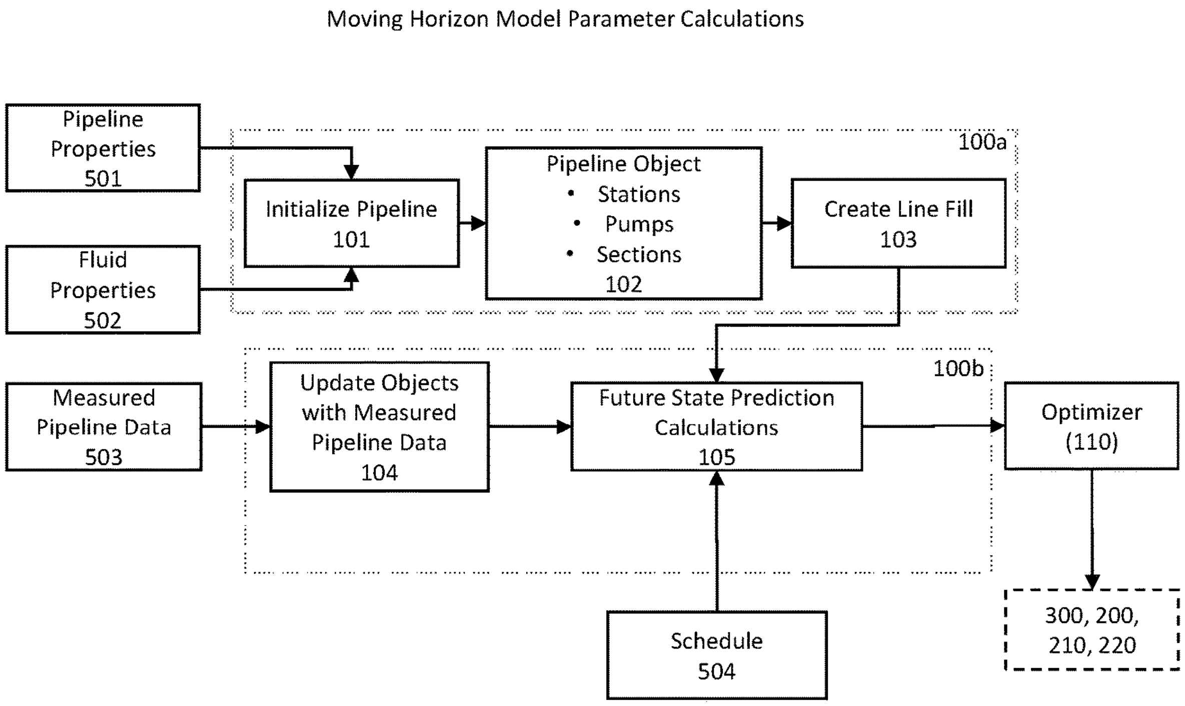
FIG. 3 is a schematic process control block diagram of a moving horizon model parameter calculation.

A schematic flow chart of the operations within the prediction module (100) is shown in FIG. 3. The moving horizon model requires scheduled flowrates and incoming fluid batch volumes.

In a first step 101, a controller (100*a*) creates pipeline objects and fluid objects (102) which are representative of pipeline properties (501) and fluid properties (502). This data may be entered by the operator, or be derived or confirmed by measurements. A pipeline object is a top level object that comprises other object classes, such as stations and sections, which in turn contain pumps and batches of fluid. Pipeline properties may include the length, diameter, number of pumps, number of DRA injection sites, pipe roughness, elevation profile and maximum operating pressure profile, variable frequency drive and pressure control valve availability. Pump information may include pump head and efficiency curves. Fluid properties may include the drag reducing agent coefficients, bulk modulus, density at a reference temperature, and viscosity coefficients for all fluids that may be transported in the pipeline.

The controller (100*a*) implements class methods for creating line fill (103), updating the pipeline (104), predicting the future state (105) and forwarding the formatted state to the optimizer (110).

Line fill (103) comprises the sequential order and volume of fluids and is created by initializing the pipeline object (102) and adding batches of fluid until the longest section of pipeline, or the entire pipeline, is filled with known fluids. The pipeline object (102) is then updated (104) with the most recent measured pipeline data (503) (also referred to herein as process data (503)), taken from measured variables. The measured pipeline data (503) may include temperature, density, viscosity, pressure, flow rate, and current drag reducing agent injection rate.

Schedule (504) data may include scheduled flow rate setpoints, planned flow rates, the fluid to be transported and fluid batch changes. Preferably, the schedule should be long enough to fill at least the longest section of pipeline, or the entire pipeline.

The updated data, line fill information and the schedule (504) are then used to calculate a future state of the pipeline. The current state from measured pipeline data (503) and the predicted future state are then provided as inputs to the optimization module (110).

Optimization Module—Moving Horizon Optimization

In one embodiment of the optimization process module (110), the operational cost of the process is minimized over a fixed time horizon. Recommended actions represent the minimal cost operation within the limits of the process and are provided to the process operator (300) for consideration or implementation.

It is possible to provide recommendations for the entire optimized horizon, however a preferred recommendation is that which is closest to the current time as the estimated parameters will be the most accurate. Minimized costs may include energy consumption costs, drag reducing agent costs, carbon dioxide equivalent emission costs, cost of operational risk such as equipment reliability, pipeline integrity, pipeline leak, overpressure, and customer service.

The output recommendation may comprise pump selection, variable frequency drive selection and speed, and/or drag reduction agent injection rate, and may include pressure setpoints. Pressure setpoints are input by the operator. A PID controller may be used to adjust the pump speed to try to match the pressure, however control valves may be included in that control loop if pressures are approaching limits.

Figure 4:
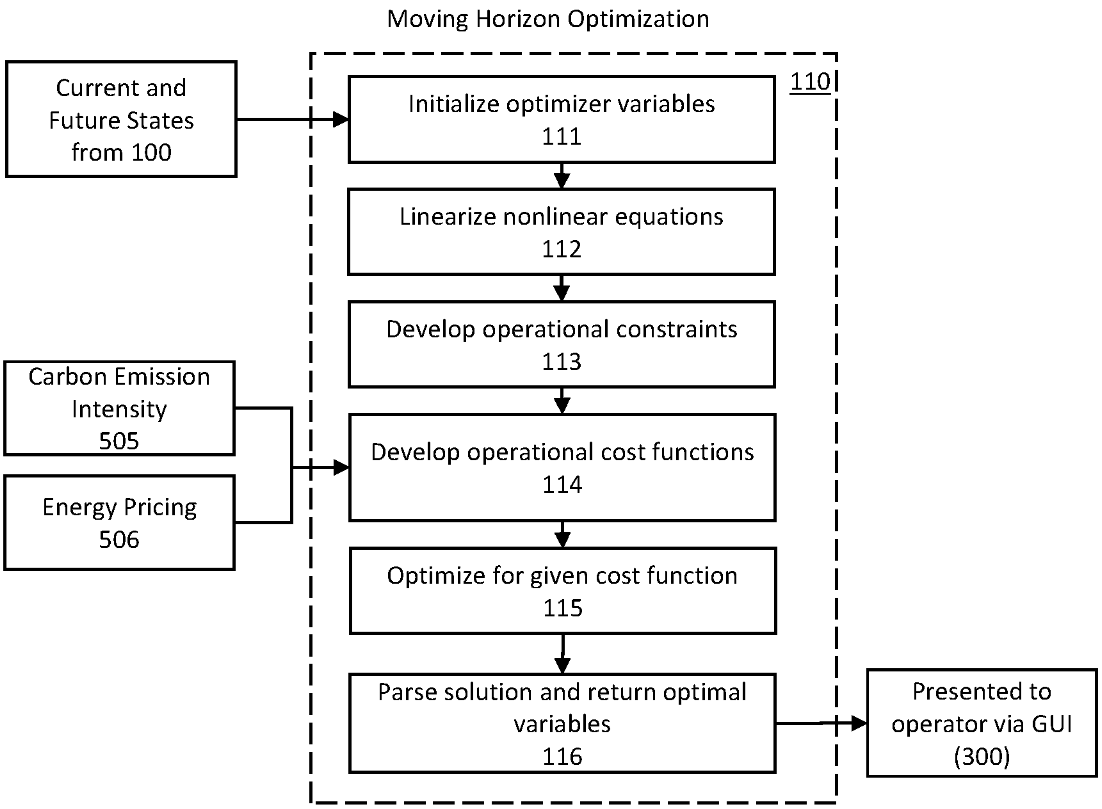
FIG. 4 is a schematic flowchart of a moving horizon optimization algorithm.

The optimization module (110) implements an algorithm such as that shown in FIG. 4. Alternatively, the optimization module may incorporate a reinforced machine learning solution to tackle non-linearity and replace mathematical-based optimization.

Initially, in step 111, variables that the optimizer receives are initialized for each station and pump object in the pipeline state using current measured and/or predicted future state values. Measured values are used for the optimization of the current time step. Predicted values are used in the optimization of future time steps.

In step 112, any non-linear equations may preferably be linearized to increase computational speed. For example, drag reducing agent and variable frequency drive functions are setup in a linear function for use in the optimization module. This may include the intermediary optimization variables and constraints required. Intermediary variables may include pumping power, pressures for each pump and each station, and various cost components.

In step 113, operational limits are imposed by adding constraints to the model. For example, constraints that limit the pressure at the suction and discharge of a pump may be imposed.

In step 114, a pipeline operational cost is calculated from such variable costs as energy pricing (506) and carbon emission intensity (505). Energy pricing (506) represents the cost of energy at a given time, either by a fixed contract or a future prediction. This can include fixed, demand, and consumption charges. This also includes consideration for peak hours and peak seasons. The carbon emission intensity (505) is the current and future tonnes of CO2/MWh for each station. The future intensity is used to optimize over future states. Robust cost modelling may be achieved by considering cost factors which may vary in different segments of the pipeline, such as regional GHG intensity and pump station specific power contracts.

An example of one variation of the cost function is $$f(C^{Total}) = \sum_t \sum_s \left(\alpha_s^{Fixed} + C_{t,s}^{Base\ Capacity} + C_{t,s}^{Add\ Capacity} + G_{t,s} \times \alpha_{t,s}^{Energy} + G_{t,s} \times \tau_{t,s} \times \alpha^{CO2} + DRA_{t,s,0} \times \alpha^{DRA} \times \omega_{t,s}\right) \forall\, t \in T\ \forall\, s \in PS$$

Where the cost $C^{total}$ is the sum of costs at each pump station over the entire time horizon. The costs may include one or more of fixed energy, current demand costs, future demand costs, energy consumption costs, CO2 emission costs, the cost of DRA used, cost of operational risk such as equipment reliability, pipeline integrity, pipeline leak, overpressure, and customer service.

The sum of the variable operational costs provides the objective function, which in one embodiment is to be minimized by the optimization module (110).

In step 115, the objective function and constraints, including the functions that link them, are minimized using a solving method. The solving method may be implemented by a mixed-integer linear programming (MILP) solver or non-linear programming (MINLP). A MILP solver implements an LP-based branch-and-bound algorithm. This divide-and-conquer approach attempts to solve the original problem by solving linear programming relaxations of a sequence of smaller subproblems. The MILP solver also implements advanced techniques such as presolving, generating cutting planes, and applying primal heuristics to improve the efficiency of the overall algorithm.

An exemplary MILP solver comprises a branch-and-bound algorithm (Land and Doig (1960)), which is known to be an effective approach to solving mixed integer linear programs. The branch-and-bound algorithm solves a mixed integer linear program by dividing the search space and generating a sequence of subproblems. The search space of a mixed integer linear program can be represented by a tree. Each node in the tree is identified with a subproblem derived from previous subproblems on the path leading to the root of the tree. Other MILP solvers known to those skilled in the art may use different algorithms to achieve the same effect.

After the optimization solution is complete, the optimization module returns recommended values for at least one controlled variable. If needed, additional calculations are performed to complete an optimal state, for example, optimized pipeline objects may be calculated or derived from the recommended values. The optimal state variables are sent to the operator, such as with a graphical user interface (GUI) as a recommendation.

EXAMPLES

In an exemplary system and method, a pipeline system with select equipment and instrumentation pertaining to the optimization methods are provided. Batches of liquid hydrocarbons are transported from the initial station (1) to the delivery terminal (2) along n sections of pipeline (4*a*-4*n*).

The energy required to transport these fluids is provided by in pumps stations (3*a*-3*n*) having pumps (6*aa*-6*nn*), driven by electric motors that can be fixed speed or variable speed. The motors may have individual VFDs, shared VFDs or no VFDs.

Process data (503) is measured at the physical locations along the pipeline by a variety of measurement instrumentation (5). These measurements can be but are not limited to pressure, temperature, flow rate, density, and viscosity. Other process data include the status of pumps and valves, and the status and speed of variable frequency drives.

The process data is communicated to the control center via the SCADA system (8) that includes programmable logic controllers and remote terminal units (7). The SCADA system (8) transmits operational settings back to the pipeline in the form of pump status, valve status, DRA injection rate, and VFD speed. Controlled variables such as pressure and flow rate can be controlled by operators but are achieved by the PLC controllers manipulating the above variables through VFDs, pressure control valves (PCVs) and valve actuators.

The desired state of the pipeline is obtained by setting control setpoints to values in accordance with the desired configuration. The pipeline control system reacts to the setpoint change through PID controllers moving actuators and measuring responses in the process data. The process responds and the data is collected by the SCADA system. This data measurement, along with the scheduled flow rate and batch injection plan, is sent to the optimization application.

The prediction module calculates and predicts the necessary data over a given time horizon, and describes calculations that happen one time when the application is started, or pipeline hydraulic calculations that happen any time when the application is started.

The optimization module optimizes the desired function over the time horizon provided and returns the optimal configuration. The optimization module describes calculations and data transfers that happen each time the optimization is run. The optimization is run on an ongoing basis as part of the control paradigm at a desired frequency.

The initial calculations are made using static pipeline properties including length, diameter, roughness, number of pumps, VFD configuration, DRA availability, and fluid properties of all fluids transported along the pipeline. Objects representing the physical pipeline and pipeline components are created using an object orientated software program. The properties and methods of these software objects are defined by a library of code. Using a top level pipeline object, the pipeline model is filled with batches of fluid until the entire length of pipe is filled with known fluids. Initialization is completed with all objects created and line fill complete.

The future state of the pipeline is predicted from the initialized pipeline and a forward-looking schedule. The horizon to which the model is predicting can be adjusted, however it should be enough time to fill the longest section of pipeline, so that the optimal amount of drag reducing agent can be found. The future state uses the scheduled flow rate and batch injection sequence to predict the pressure drop between stations, the position and volume of batches, and to track the drag reducing agent already present in the pipeline. A set of described future states up to the given horizon is then sent to the optimization module.

Operational costs to transport the fluid, such as those described above, are determined, and include the energy cost to operate the pumps, drag reducing agent injected into the fluid to reduce frictional losses. The cost of carbon dioxide emissions may be included in the energy cost or may be separate as in the case of gas compressors that burn natural gas directly. The cost of carbon dioxide emissions may be considered as part of the objective variable to reduce the triple bottom line even if the monetary cost is already captured by the cost for pumping energy.

A minimal cost may be found by choosing stations to optimally pass pressure, bypassing stations where possible, balancing DRA injections with pumping pressure and optimizing the maximum power at each station for the pipeline.

The recommendations determined by the optimization module are passed on to the operator, who chooses to implement none, some or all of the recommendations. The accepted inputs are then used by the control module and sent to (or used by) the actuators to control process variables. The results of the operator's actions will be reflected in the measured data and a new optimal configuration may be determined.

Definitions and Interpretation

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), network attached storage, cloud storage, or other memory devices or locations, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. An operating system for optimizing a pipeline objective for a pipeline system comprising a plurality of pipeline sections, the operating system comprising at least one controller configured to:

(a) generate a current state of at least one section of the pipeline, the current state comprising the measured state of at least one pipeline object and at least one fluid object;

(b) generate a line fill comprising a sequential order and volume of fluids present in the pipeline;

(c) generate a predicted future state of the at least one section of the pipeline from the line fill, and a schedule of planned additions of fluids and planned flow rates;

(d) generate an optimized future state of the at least one section of the pipeline with an optimization function;

(e) determine one or more setpoints to implement the optimized future state; and (f) implement the setpoints by controlling one or more pipeline actuators.

2. The operating system of claim 1, wherein the optimization function comprises at least one of a cost minimization function, an emissions minimization function, and/or an energy/resource usage minimization function.

3. The system of claim 2, wherein the pipeline objective is cost minimization and the cost minimization function comprises cost of (a) energy, (b) risk, (c) safety, reliability and/or efficiency measures, (d) customer satisfaction and/or (e) carbon emission intensity.

4. The system of claim 3, wherein cost of energy is the same or different for different pipeline sections, and cost minimization is optimized for each pipeline section.

5. The system of claim 1, wherein the measured state comprises measured pipeline data.

6. The system of claim 5, wherein the measured pipeline data comprises one or more of temperature, density, viscosity, pressure, flow rate, and/or drag reducing agent injection rate.

7. The system of claim 1, wherein the setpoints comprise an optimized setting for one or more pipeline actuators.

8. The system of claim 7, wherein the optimized setting for the one or more pipeline actuators includes one or more of pressure setpoints, pump statuses, variable frequency drive (VFD) speeds and states, and drag reducing agent (DRA) injection rates.

9. A method of optimizing a pipeline objective for a pipeline system comprising a plurality of pipeline sections, comprising:

(a) generating a current state of at least one section of the pipeline, the current state comprising the measured state of at least one pipeline object and at least one fluid object;

(b) generating a line fill comprising a sequential order and volume of fluids present in the pipeline;

(c) generating a predicted future state of the at least one section of the pipeline from the line fill, and a schedule of planned fluids and planned flow rates;

(d) generate an optimized future state of the at least one section of the pipeline with an optimization function;

(e) providing setpoints for the pipeline to implement the optimized future state; and (f) implementing the setpoints to realize the optimized future state, herein the implementing comprises controlling one or more pipeline actuators.

10. The method of claim 9, wherein the optimization function comprises at least one of a cost minimization function, an emissions minimization function, and/or an energy/resource usage minimization function.

11. The method of claim 10, wherein the pipeline objective is cost minimization and the cost minimization function comprises cost of (a) energy, (b) risk, (c) safety, reliability and/or efficiency measures, (d) customer satisfaction and/or (e) carbon emission intensity.

12. The method of claim 11, wherein cost of energy is the same or different for different pipeline sections, and cost minimization is optimized for each pipeline section.

13. The method of claim 9, wherein the measured state comprises measured pipeline data.

14. The method of claim 13, wherein the measured pipeline data comprises one or more of temperature, density, viscosity, pressure, flow rate, and/or drag reducing agent injection rate.

15. The method of claim 9, wherein the setpoints comprise an optimized setting for one or more pipeline actuators.

16. The method of claim 15, wherein the optimized setting for the one or more pipeline actuators includes one or more of pressure setpoints, pump statuses, variable frequency drive (VFD) speeds and states, and drag reducing agent (DRA) injection rates.

17. The system of claim 1, wherein the at least one controller comprises an automated pipeline operator or a control system that implements the setpoints.

18. The method of claim 9, wherein the method is performed by at least one controller.

19. The method of claim 18, wherein the at least one controller comprises an automated pipeline operator or a control system that implements the setpoints.

* * * * *